US012696084B2

(12) United States Patent　　　　　　(10) Patent No.:　US 12,696,084 B2

Vig et al.　　　　　　　　　　　　　　　(45) Date of Patent:　Jul. 28, 2026

(54) OPTIMIZATION OF FAST CONNECTION, ROAMING AND STEERING IN DPP NETWORKS

(71) Applicant: MediaTek Singapore Pte. Ltd., Singapore (SG)

(72) Inventors: Prakhar Vig, Noida (IN); Amit Shakya, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/128,302

(22) Filed: Mar. 30, 2023

(65) Prior Publication Data

US 2023/0336986 A1　　Oct. 19, 2023

(51) Int. Cl.
　*G06F 21/62*　　　(2013.01)
　*G06F 21/60*　　　(2013.01)
　*H04W 12/041*　　(2021.01)
　*H04W 12/06*　　　(2021.01)
　*H04W 76/10*　　　(2018.01)

(52) U.S. Cl.
　CPC ......... *H04W 12/06* (2013.01); *H04W 12/041* (2021.01); *H04W 76/10* (2018.02)

(58) Field of Classification Search
　CPC .... H04W 12/06; H04W 76/10; H04W 12/041
　USPC .......................................................... 726/6
　See application file for complete search history.

(56) References Cited

U.S. PATENT DOCUMENTS

| | | | |
|---|---|---|---|
| 11,432,138 B1 * | 8/2022 | Jiang ..................... | H04L 63/062 |
| 2020/0169461 A1 * | 5/2020 | Stationwala ........ | H04L 41/0806 |
| 2021/0099950 A1 * | 4/2021 | Shibata ................. | H04L 9/3247 |
| 2022/0159106 A1 * | 5/2022 | Kim ........................ | H04L 5/003 |

FOREIGN PATENT DOCUMENTS

| | | | | |
|---|---|---|---|---|
| WO | WO-2020080850 A1 * | 4/2020 | ............ | H04W 12/06 |
| WO | WO-2020195809 A1 * | 10/2020 | .......... | G06F 9/4401 |
| WO | WO-2021161225 A1 * | 8/2021 | .......... | H04L 41/046 |

* cited by examiner

*Primary Examiner* — Haresh N Patel

(74) *Attorney, Agent, or Firm* — Andy M. Han; Han IP PLLC

(57)　　　　　ABSTRACT

Various schemes pertaining to optimization of fast connection, roaming and steering in Device Provisioning Protocol (DPP) networks are described. A secure connection is formed between a first network device and a second network device in a DPP network by performing an optimized network introduction procedure. Relative to a convention network introduction procedure, an overhead in network introduction frame exchanges is reduced with the optimized network introduction procedure.

18 Claims, 6 Drawing Sheets

600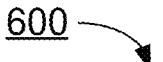

FORM A SECURE CONNECTION BETWEEN A FIRST NETWORK DEVICE AND A SECOND NETWORK DEVICE IN A DEVICE PROVISIONING PROTOCOL (DPP) NETWORK BY PERFORMING AN OPTIMIZED NETWORK INTRODUCTION PROCEDURE SUCH THAT, RELATIVE TO A CONVENTION NETWORK INTRODUCTION PROCEDURE, AN OVERHEAD IN NETWORK INTRODUCTION FRAME EXCHANGES IS REDUCED WITH THE OPTIMIZED NETWORK INTRODUCTION PROCEDURE
610

FIG. 6

OPTIMIZATION OF FAST CONNECTION, ROAMING AND STEERING IN DPP NETWORKS

CROSS REFERENCE TO RELATED PATENT APPLICATION(S)

The present disclosure claims the priority benefit of India patent application No. 202221022180, filed 13 Apr. 2022, the content of which being incorporated by reference in its entirety.

TECHNICAL FIELD

The present disclosure is generally related to computer networking and, more particularly, to optimization of fast connection, roaming and steering in Device Provisioning Protocol (DPP) networks.

BACKGROUND

Unless otherwise indicated herein, approaches described in this section are not prior art to the claims listed below and are not admitted to be prior art by inclusion in this section.

In a Wi-Fi network, such as a DPP network implementing one or more of Institute of Electrical and Electronics Engineers (IEEE) 802.11 standards, a station (STA) initiates a DPP Network Introduction procedure by sending a DPP Peer Discovery Request frame as a unicast frame in case of connecting to a specific known device (note: an Authentication and Key Management (AKM) suite selector of a Robust Security Network (RSN) information element (IE) in a beacon or probe response is DPP). For example, a device B may transmit to a device A the following information: Transaction identifier (ID), and its connector peer information which was generated during DPP configuration. In response, device A may transmit to device B the following information: Transaction ID, DPP Status, and its connector which was generated during DPP configuration. A Pairwise Master Key (PMK) and a PMK identifier (PMKID) may be derived or otherwise generated for further secure connection.

In a DPP network, an Enrollee STA or Proxy Agent STA needs to carry out a two-step Network Introduction procedure of DPP whenever it initially forms a first connection to any other DPP device with DPP AKM. However, the Network Introduction procedure is not limited to the first connection even during roaming or reconnection, as peer devices need to carry out the Network Introduction procedure again. This Network Introduction procedure includes a two-message flow sequence (Peer Discovery Request and Peer Discovery Response) which is an overhead added by the Network Introduction protocol. Undesirably, this tends to increase the time spent in connection, roaming and steering. Therefore, there is a need for a solution of optimization of fast connection, roaming and steering in DPP networks.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose novel schemes pertaining to optimization of fast connection, roaming and steering in DPP networks. It is believed that implementation of various proposed schemes of the present disclosure may reduce or otherwise minimize the time spent in connection, roaming and steering in DPP networks.

In one aspect, a method may involve a secure connection being formed between a first network device and a second network device in a DPP network by performing an optimized network introduction procedure. Relative to a convention network introduction procedure, an overhead in network introduction frame exchanges may be reduced with the optimized network introduction procedure.

In another aspect, an apparatus may include a transceiver and a processor. The transceiver may be configured to communicate wirelessly. The processor may, via the transceiver, form a secure connection between a first network device and a second network device in a DPP network by performing an optimized network introduction procedure. Relative to a convention network introduction procedure, an overhead in network introduction frame exchanges may be reduced with the optimized network introduction procedure.

It is noteworthy that, although description provided herein may be in the context of certain radio access technologies, networks and network topologies such as Wi-Fi and DPP networks, the proposed concepts, schemes and any variation(s)/derivative(s) thereof may be implemented in, for and by other types of radio access technologies, networks and network topologies such as, for example and without limitation, repeater networks, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 6 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimization of fast connection, roaming and steering in DPP networks. According to the present disclosure, a number of possible solutions may be implemented separately or jointly. That is, although these possible solutions may be described below separately, two or more of these possible solutions may be implemented in one combination or another.

Figure 1:
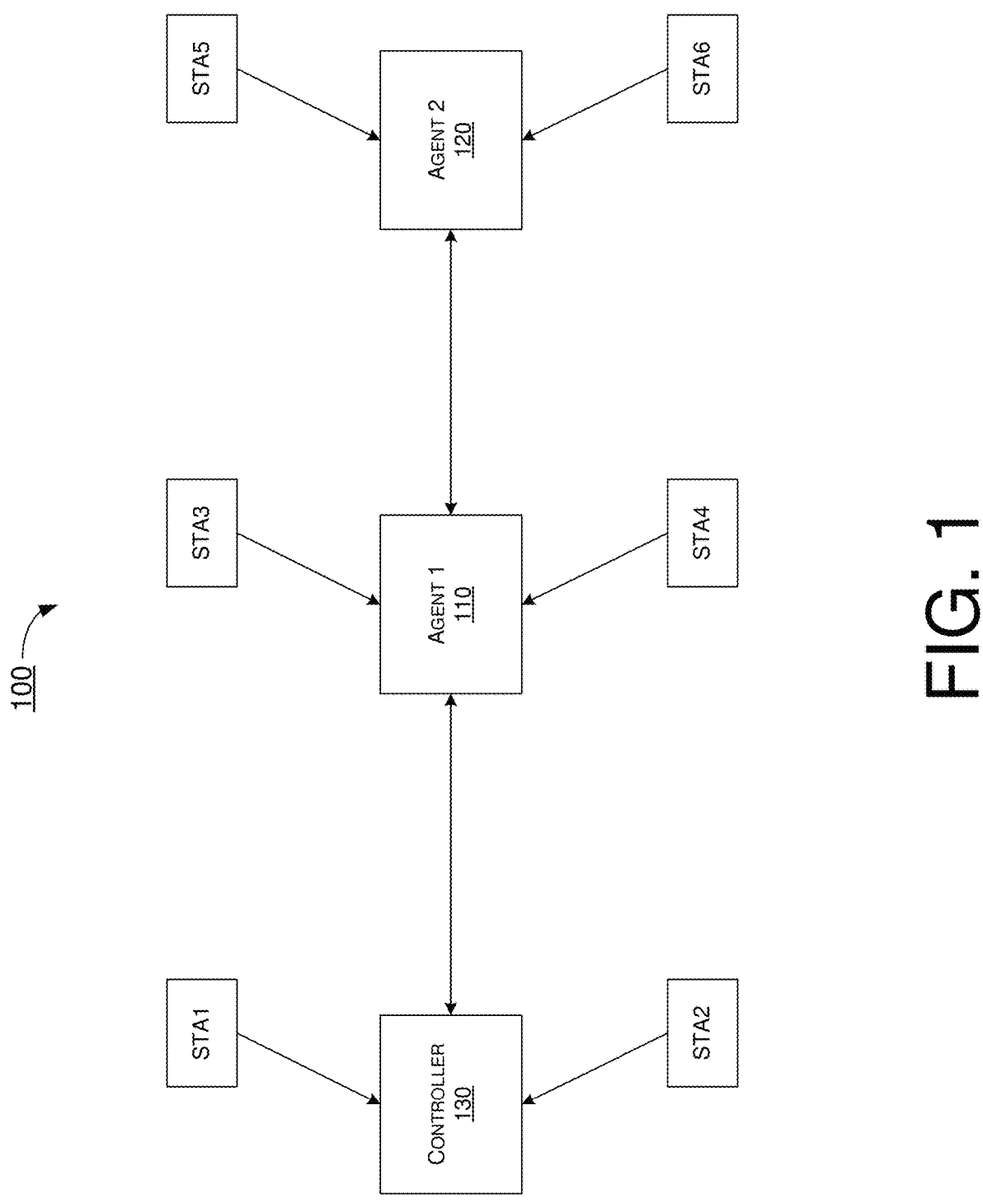
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve a wireless network (e.g., a mesh network such as a DPP network) having a controller 130, a plurality of agents, and a plurality of STAs. For illustrative purposes and simplicity, two agents such as agent 110 (herein interchangeably referred to as "Agent 1") and agent 120 (herein interchangeably referred to as "Agent 2"). Each of controller 130, agent 110 and agent 120 may be in communication with one or more associated STAs (e.g., STA1 and STA2 associated with controller 130, STA3 and STA4 associated with agent 110, and STA5 and STA6 associated with agent 120) are shown in FIG. 1, although different numbers of agents and STAs may be present in various implementations. Under various proposed schemes in accordance with the present disclosure, each of controller 130, agent 110, agent 120 and the plurality of STAs may be configured to perform respective aspects of optimization of fast connection, roaming and steering in DPP networks in accordance with various proposed schemes described below. It is noteworthy that, although various proposed schemes in accordance with the present disclosure may be individually described below, in actual implementations some or all of the proposed schemes may be implemented jointly or individually.

In the present disclosure, the term "agent" refers to an entity or device which is part of a mesh network controlled by a controller and supports the functionality of an access point (AP) STA or non-AP STA. Moreover, the term "controller" refers to a centralized entity or device which controls the devices (e.g., agents) present in the mesh network. In some implementations, an AP STA may function as a controller while one or more other AP STA(s) may function as one or more agent(s). Moreover, the term "Network Introduction Stage" refers to a stage that helps in generating a PMK between two devices for forming a secure connection where an enrollee is to indicate the corresponding PMKID in an Association Requestion frame.

In a multiple-AP (MAP) network such as a MAP-R3 network, a controller is a central device that configures other devices using a DPP configuration protocol. The controller controls the network and broadcasts a control channel element (CCE) IE in its beacon and/or probe response to announce its presence to other agent devices in the network. An agent, herein interchangeably referred to as an enrollee device or enrollee agent, can join the network through a DPP connection to the controller. The agent can create a channel list and send a presence announcement action frame on the channel, then the agent can wait at least 2 seconds for a response from the controller. The following DPP R2 message flow may be carried out to form the DPP connection: Authentication→Configuration→Network Introduction. Moreover, a proxy agent, which is a device that was previously MAP R3 onboarded to the network via the controller or another device. Upon onboarding or upon receiving a DPP Uniform Resource Identifier (URI), the controller indicates the proxy agent to enable the CCE IE in its beacon and/or probe response. In case that the controller is not reachable directly by a new agent or in case that the controller does not handle DPP action frames directly, an existing agent can act as a proxy agent and forward messages from an enrollee agent to the controller through Proxied or Direct encapsulated 1905 messages.

During DPP provisioning, an exchange of DPP message flow between an initiator or configurator (e.g., an AP or controller) and a responder or enrollee (e.g., a STA or agent) may first involve a bootstrapping stage, followed by a DPP Authentication stage, followed by a DPP Configuration stage. During the bootstrapping stage, the initiator/configurator may obtain bootstrapping information from the responder/enrollee using an out-of-band (OOB) mechanism (e.g., scanning of a QR code, near-field communication (NFC) tap or Bluetooth exchange). The bootstrapping information may include the enrollee's bootstrapping public key (BR), a global operating class channel, and a channel list for DPP Authentication. During the DPP Authentication stage, the initiator configurator may begin operation by broadcasting one or more DP Authentication Requests. For example, a DPP Authentication Request may be sent by the initiator/configurator to the responder/enrollee and, upon successfully receiving the DPP Authentication Request and matching the bootstrapping public key, the responder/enrollee may respond by sending a DPP Authentication Response to the initiator/configurator. Upon successful authentication, the initiator/configurator may send a DPP Authentication Confirmation to the responder/enrollee. During the DPP Configuration stage, the responder/enrollee may send a DPP Configuration Request to the initiator/configurator, which may in turn respond by sending a DPP Configuration Response to the responder/enrollee. It is during this DPP Configuration stage that respective connector is generated for each of the initiator/configurator and responder/enrollee.

In performing a conventional Network Introduction procedure, a STA or agent and an AP or controller first perform IEEE 802.11 scanning. Upon discovery of the AP/controller during the IEEE 802.11 scanning, the STA/agent sends a Peer Discovery Request (with its connector (e.g., ConnectorB) and a transaction ID) to the AP/controller, followed by the AP/controller sending a Peer Discovery Response (with transaction ID, DPP status and its connector (e.g., ConnectorA)) to the STA/agent. Each of the STA/agent and AP/controller can then derive or otherwise generate a PMK and a PMKID based on the received information to form a secure connection by performing authentication and association in accordance with the IEEE 802.11 standard.

Figure 2:
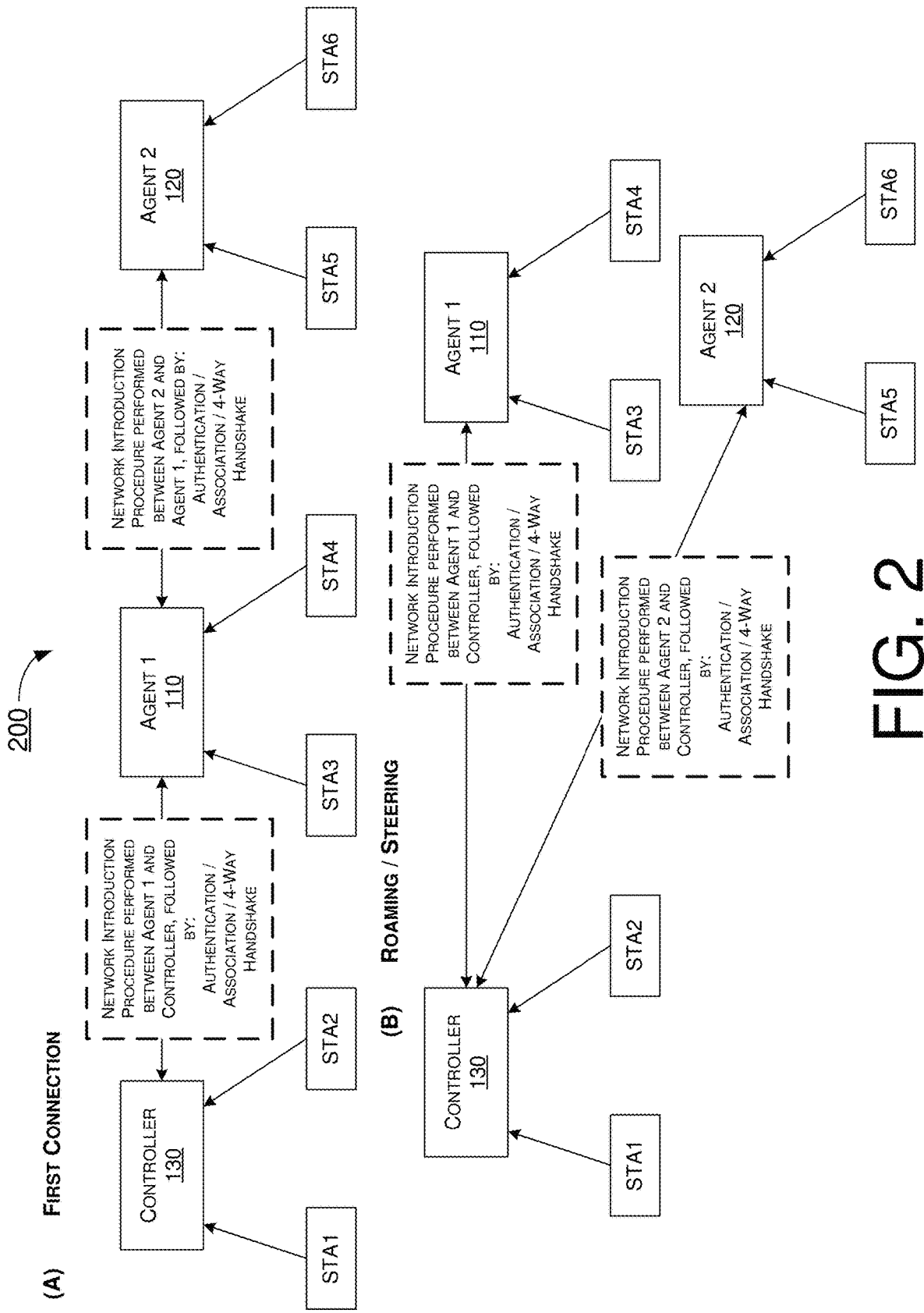
FIG. 2 is a diagram of an example scenario in accordance with the present disclosure.

FIG. 2 illustrates an example scenario 200 of first connection and roaming/steering in a DPP network. In scenario 200, each of controller 130, agent 110 and agent 120 may have one or more STAs connected thereto. Referring to part (A) of FIG. 2, which shows an example of first connection, agent 110 may carry out the Network Introduction Protocol with controller 130, followed by Authentication, Association, and a four-way handshake, to establish a connection with controller 130. As agent 120 may not reach controller 130 directly (e.g., due to distance), agent 120 may carry out the Network Introduction Protocol with agent 110, followed by Authentication, Association, and a four-way handshake, to establish a connection with controller 130 with agent 110 being a proxy agent. Referring to part (B) of FIG. 2, which shows an example of roaming or steering with each of agent 110 and agent 120 being able to directly reach controller 130, each of agent 110 and agent 120 may carry out the Network Introduction Protocol with controller 130, followed by Authentication, Association, and a four-way handshake, to connect to controller 130.

In the Network Discovery stage, a STA (e.g., agent 110 or agent 120) may share its connector in a Peer Discovery Request, and a Peer AP (e.g., agent 120 or agent 110) may share its connector to the STA in a Peer Discovery Response in an event that the Peer Discovery Request is determined to be valid or otherwise acceptable. Under a proposed scheme in accordance with the present disclosure, a Network Discovery Request may be piggybacked in an Authentication request. For instance, a STA (e.g., agent 110 or agent 120) may pass its connector in an Authentication Request transmitted by the STA to an AP (e.g., agent 120 or agent 110) in case that it is a DPP connection and the AP will use the connector to generate a PMK and a PMKID. Then, the AP may pass its connector in an Authentication Response transmitted by the AP to the STA in case that the AP finds a valid connector and is able to generate the PMK. Next, the STA may also generate the PMK using a received connector in the Authentication Response and will include the PMKID in the Association Request. Under the proposed scheme, in case that the PMKID is rejected by the AP due to any reason, the AP may send the Authentication Requestion with an indication of failure.

Figure 3:
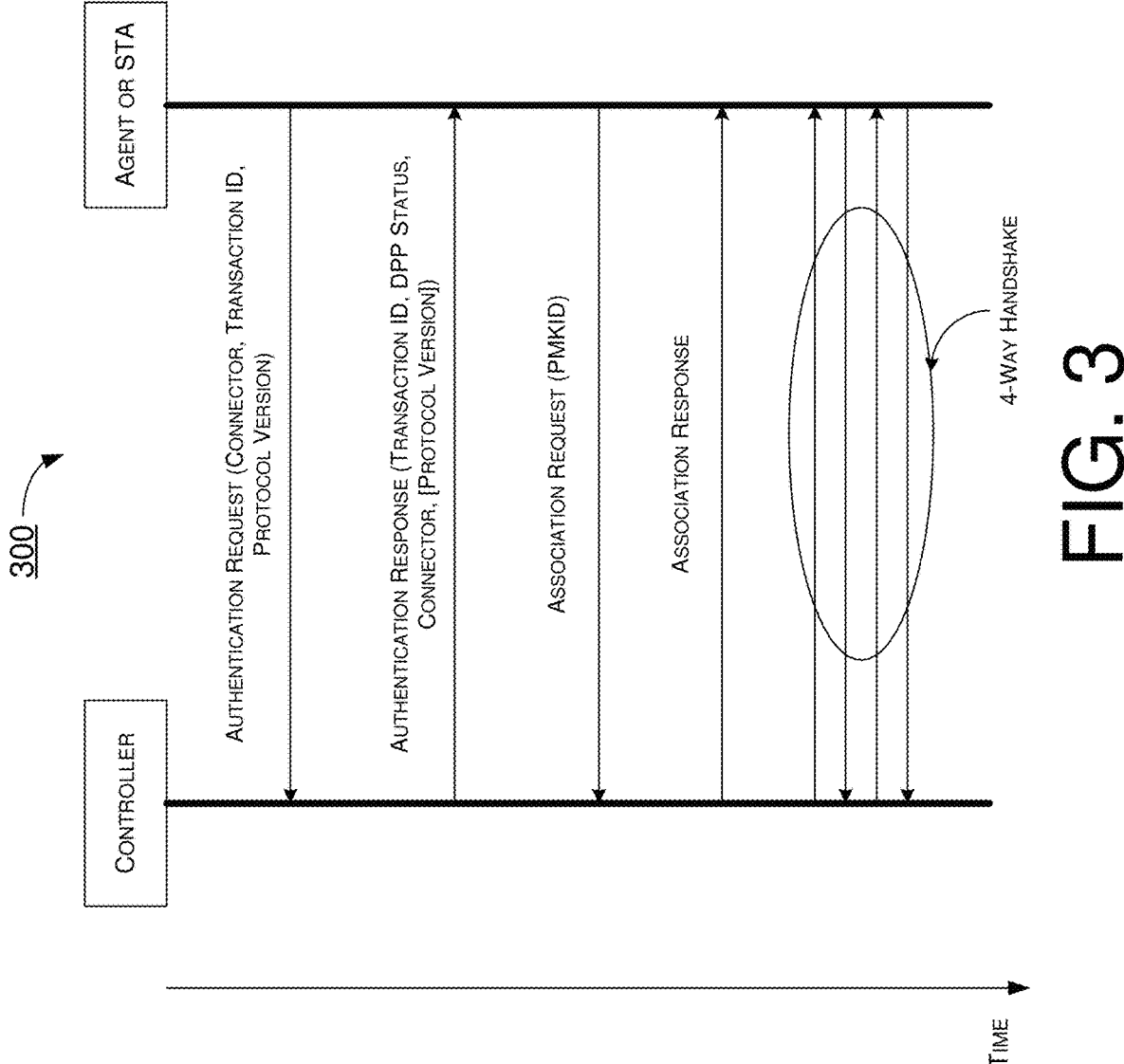
FIG. 3 is a diagram of an example scenario in accordance with the present disclosure.

FIG. 3 illustrates an example scenario 300 of optimized network introduction under a proposed scheme in accordance with the present disclosure. Referring to FIG. 3, an agent or STA may initiate an optimized Network Introduction procedure by transmitting an Authentication Request, which includes a connector, a transaction ID and a protocol version, to a controller. The controller may respond by transmitting an Authentication Response, which includes the transaction ID, DPP status and a connector (and optionally the protocol version), to the agent or STA. Then, the agent or STA may transmit an Association Request with a PMKID to the controller. In response, the controller may transmit an Association Response to the agent or STA. Next, a four-way handshake may be carried out to complete the Network Introduction procedure.

Figure 4:
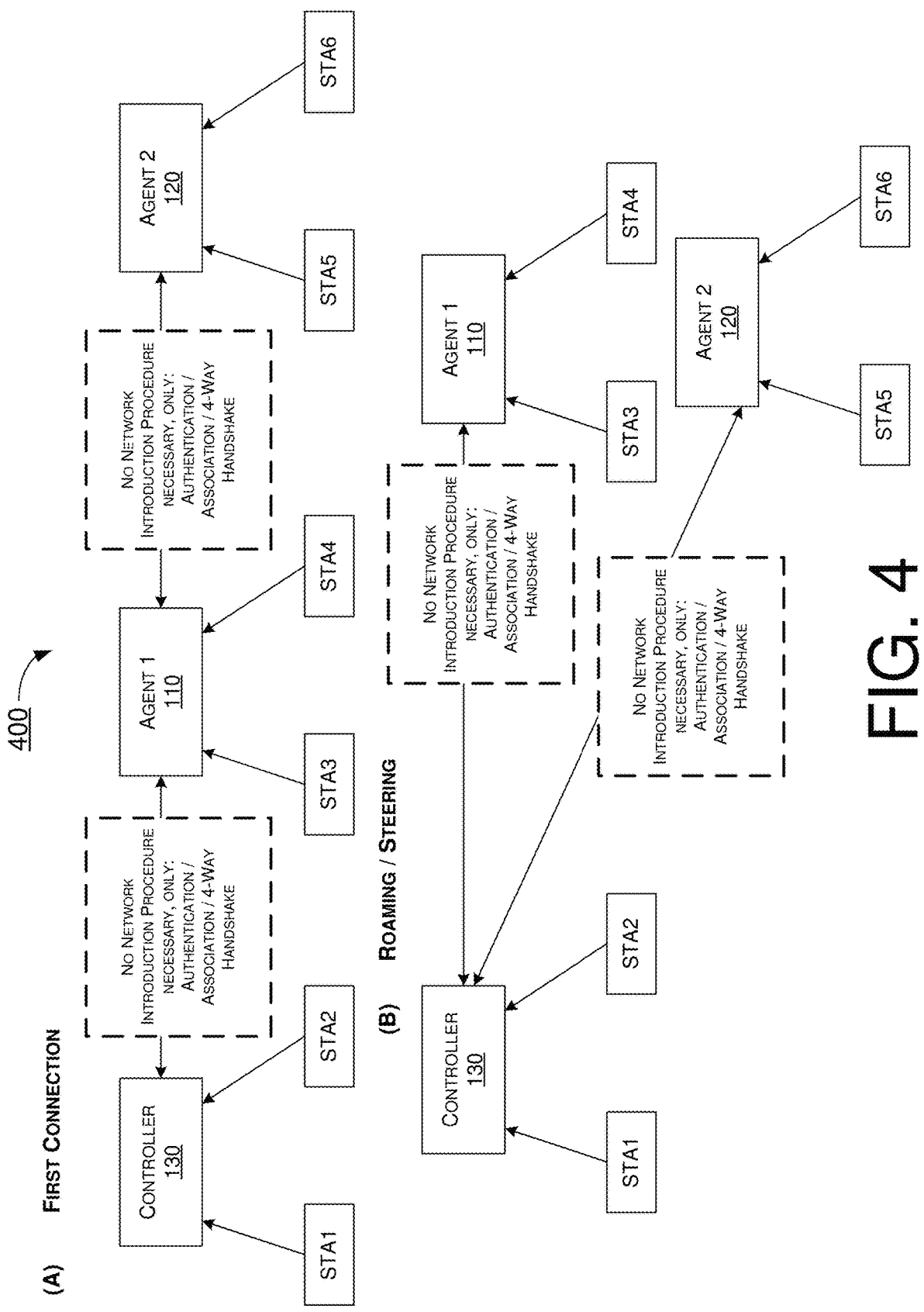
FIG. 4 is a diagram of an example scenario in accordance with the present disclosure.

FIG. 4 illustrates an example scenario 400 of optimized network introduction under a proposed scheme in accordance with the present disclosure. In scenario 400, each of controller 130, agent 110 and agent 120 may have one or more STAs connected thereto. Referring to part (A) of FIG. 4, which shows an example of first connection under the proposed scheme, agent 110 may carry out or otherwise perform an Authentication frame exchange, an Association frame exchange, and a four-way handshake with controller 130 to establish a connection with controller 130. As agent 120 may not reach controller 130 directly (e.g., due to distance), agent 120 may carry out or otherwise perform an Authentication frame exchange, an Association frame exchange, and a four-way handshake with agent 110 to establish a connection with controller 130 with agent 110 being a proxy agent. Referring to part (B) of FIG. 4, which shows an example of roaming or steering under the proposed scheme with each of agent 110 and agent 120 being able to directly reach controller 130, each of agent 110 and agent 120 may carry out or otherwise perform an Authentication frame exchange, an Association frame exchange, and a four-way handshake with controller 130 to connect to controller 130. Advantageously, under the proposed scheme, there is no need to separately carry out the peer discovery request and response frame exchange of the conventional Network Introduction procedure, thereby reducing overhead while improving system efficiency.

As can be seen, under the proposed schemes, network introduction frame exchanges may be reduced, as there is no need to perform peer discovery request and response frame exchange separately. Consequently, connection time may be improved (i.e., reduced) as there is no overhead of network introduction frame exchange. Moreover, improved roaming time in DPP may be achieved, which may be useful for fast connection, roaming and/or steering. Furthermore, the proposed schemes may be applicable to MAP and non-MAP DPP STA networks.

Illustrative Implementations

Figure 5:
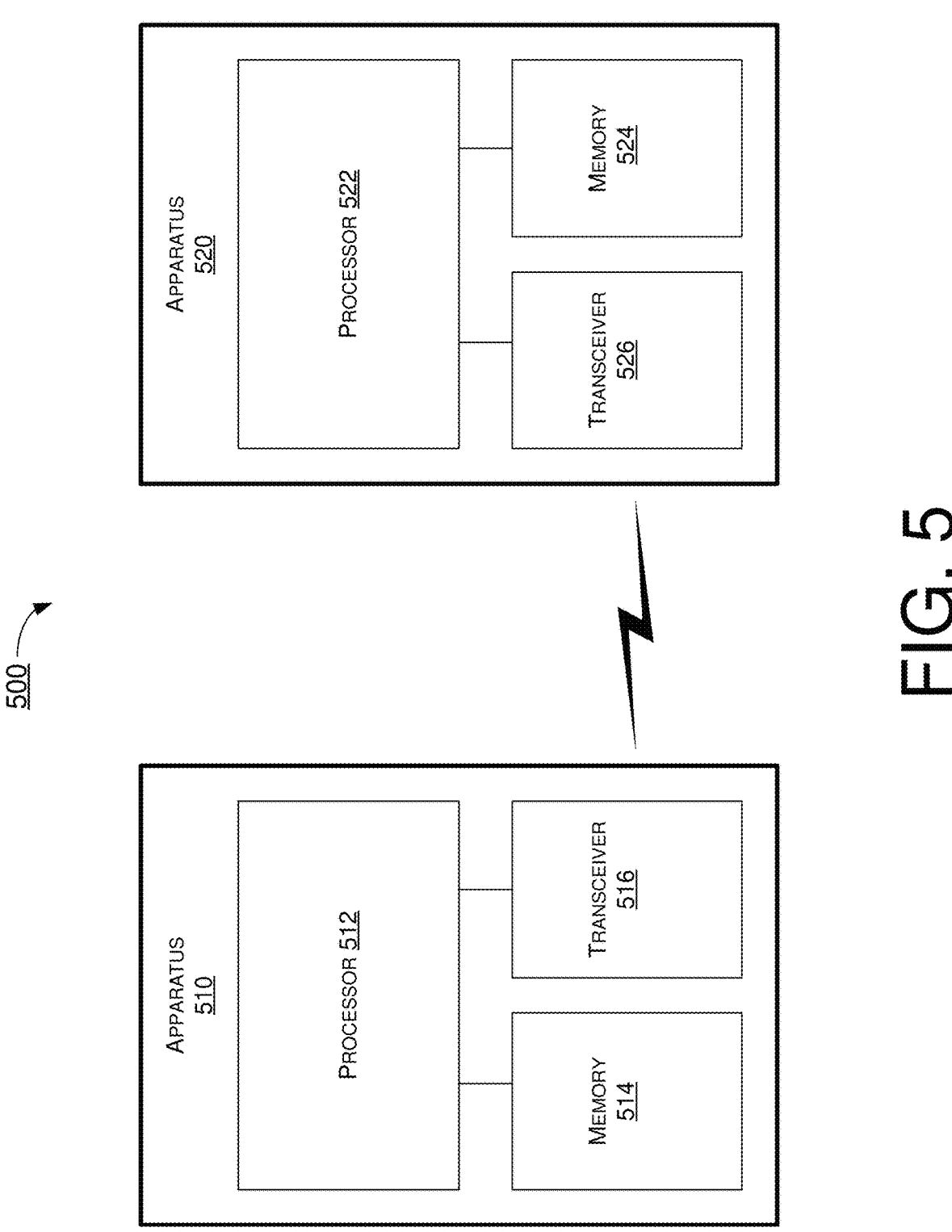
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to optimization of fast connection, roaming and steering in DPP networks, including the various schemes described above with respect to various proposed designs, concepts, schemes, systems and methods described above as well as processes described below. For instance, apparatus 510 may be implemented in one of agent 110, agent 120 and controller 130, and apparatus 520 may be implemented in another one of agent 110, agent 120 and controller 130.

Each of apparatus 510 and apparatus 520 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a non-AP STA or an AP STA. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to optimization of fast connection, roaming and steering in DPP networks in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510 and apparatus 520 is provided below in the context of apparatus 510 implemented in or as an agent (e.g., agent 110 or agent 120) and apparatus 520 implemented in or as another agent or a controller (e.g., controller 130) of a DPP network such as a WLAN in network environment 100 in accordance with one or more of IEEE 802.11 standards. It is noteworthy that, although the example implementations described below are provided in the context of WLAN, the same may be implemented in other types of networks.

Under a proposed scheme pertaining to optimization of fast connection, roaming and steering in DPP networks in accordance with the present disclosure, processor 512 of apparatus 510 may form, via transceiver 516, a secure connection between a first network device and a second network device in a DPP network by performing an optimized network introduction procedure. Relative to a convention network introduction procedure, an overhead in network introduction frame exchanges may be reduced with the optimized network introduction procedure.

In some implementations, the optimized network introduction procedure may involve no frame exchange of a peer discovery request and a peer discovery response between the first network device and the second network device. In some implementations, in forming the secure connection by performing the optimized network introduction procedure, processor 512 may perform (e.g., in conjunction with processor 522 of apparatus 520) an authentication frame exchange, an association frame exchange, and a four-way handshake.

In some implementations, apparatus 510 may be implemented in or as the first network device. In such cases, in forming the secure connection by performing the optimized network introduction procedure, processor 512 may perform certain operations. For instance, processor 512 may transmit an authentication request to the second network device, with the authentication request including at least a first connector configured for the first network device during a DPP configuration stage. Additionally, processor 512 may receive an authentication response from the second network device responsive to transmitting the authentication request, with the authentication response including at least a second connector configured for the second network device during the DPP configuration stage. Moreover, processor 512 may generate a PMK based least in part on information in the authentication response. Also, processor 512 may generate a PMKID. Furthermore, processor 512 may transmit an association request to the second network device, with the association request including at least the PMKID. Additionally, processor 512 may receive an association response from the second network device responsive to transmitting the association request. Moreover, processor 512 may perform a four-way handshake procedure with the second network device.

In some implementations, apparatus 510 may be implemented in or as the second network device. In such cases, in forming the secure connection by performing the optimized network introduction procedure, processor 512 may perform certain operations. For instance, processor 512 may receive an authentication request from the first network device, with the authentication request including at least a first connector configured for the first network device during a DPP configuration stage. Additionally, processor 512 may transmit an authentication response to the first network device responsive to receiving the authentication request, with the authentication response including at least a second connector configured for the second network device during the DPP configuration stage. Moreover, processor 512 may generate a PMK based least in part on information in the authentication request. Also, processor 512 may receive an association request from the first network device, with the association request including at least a PMKID generated by the first network device. Furthermore, processor 512 may transmit an association response to the first network device responsive to receiving the association request. Additionally, processor 512 may perform a four-way handshake procedure with the first network device.

In some implementations, in forming the secure connection by performing the optimized network introduction procedure, processor 512 may form a first connection between the first network device and the second network device. Alternatively, in forming the secure connection by performing the optimized network introduction procedure, processor 512 may form the secure connection between the first network device and the second network device during roaming or steering by the first network device or the second network device.

In some implementations, the DPP network may include a MAP DPP network. Alternatively, the DPP network may include a non-MAP DPP network.

In some implementations, the first network device may include a controller, an AP or a first agent. Correspondingly, the second network device may include an second agent or a STA.

Illustrative Processes

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to optimization of fast connection, roaming and steering in DPP networks in accordance with the present disclosure. Process 600 may include one or more operations, actions, or functions as illustrated by block 610. Although illustrated as discrete blocks, block 610 of process 600 may be divided into additional blocks, and sub-blocks of process 600 may be combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as an agent (e.g., agent 110 or agent 120) and apparatus 520 implemented in or as another agent or a controller (e.g., controller 130) of a DPP network such as a WLAN in network environment 100 in accordance with one or more of IEEE 802.11 standards. Process 600 may begin at block 610.

At 610, process 600 may involve processor 512 of apparatus 510 forming, via transceiver 516, a secure connection between a first network device and a second network device in a DPP network by performing an optimized network introduction procedure. Relative to a convention network introduction procedure, an overhead in network introduction frame exchanges may be reduced with the optimized network introduction procedure.

In some implementations, the optimized network introduction procedure may involve no frame exchange of a peer discovery request and a peer discovery response between the first network device and the second network device. In some implementations, in forming the secure connection by performing the optimized network introduction procedure, process 600 may involve processor 512 performing (e.g., in conjunction with processor 522 of apparatus 520) an authentication frame exchange, an association frame exchange, and a four-way handshake.

In some implementations, apparatus 510 may be implemented in or as the first network device. In such cases, in forming the secure connection by performing the optimized network introduction procedure, process 600 may involve processor 512 performing certain operations. For instance, process 600 may involve processor 512 transmitting an authentication request to the second network device, with the authentication request including at least a first connector configured for the first network device during a DPP configuration stage. Additionally, process 600 may involve processor 512 receiving an authentication response from the second network device responsive to transmitting the authentication request, with the authentication response including at least a second connector configured for the second network device during the DPP configuration stage. Moreover, process 600 may involve processor 512 generating a PMK based least in part on information in the authentication response. Also, process 600 may involve processor 512 generating a PMKID. Furthermore, process 600 may involve processor 512 transmitting an association request to the second network device, with the association request including at least the PMKID. Additionally, process 600 may involve processor 512 receiving an association response from the second network device responsive to transmitting the association request. Moreover, process 600 may involve processor 512 performing a four-way handshake procedure with the second network device.

In some implementations, apparatus 510 may be implemented in or as the second network device. In such cases, in forming the secure connection by performing the optimized network introduction procedure, process 600 may involve processor 512 performing certain operations. For instance, process 600 may involve processor 512 receiving an authentication request from the first network device, with the authentication request including at least a first connector configured for the first network device during a DPP configuration stage. Additionally, process 600 may involve processor 512 transmitting an authentication response to the first network device responsive to receiving the authentication request, with the authentication response including at least a second connector configured for the second network device during the DPP configuration stage. Moreover, process 600 may involve processor 512 generating a PMK based least in part on information in the authentication request. Also, process 600 may involve processor 512 receiving an association request from the first network device, with the association request including at least a PMKID generated by the first network device. Furthermore, process 600 may involve processor 512 transmitting an association response to the first network device responsive to receiving the association request. Additionally, process 600 may involve processor 512 performing a four-way handshake procedure with the first network device.

In some implementations, in forming the secure connection by performing the optimized network introduction procedure, process 600 may involve processor 512 forming a first connection between the first network device and the second network device. Alternatively, in forming the secure connection by performing the optimized network introduction procedure, process 600 may involve processor 512 forming the secure connection between the first network device and the second network device during roaming or steering by the first network device or the second network device.

In some implementations, the DPP network may include a MAP DPP network. Alternatively, the DPP network may include a non-MAP DPP network.

In some implementations, the first network device may include a controller, an AP or a first agent. Correspondingly, the second network device may include an second agent or a STA.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   forming a secure connection between a first network device and a second network device in a Device Provisioning Protocol (DPP) network by performing an optimized network introduction procedure,
   wherein, relative to a convention network introduction procedure comprising sending a peer discovery request and sending a peer discovery response, an overhead in network introduction frame exchanges is reduced with the optimized network introduction procedure, and
   wherein the optimized network introduction procedure involves no frame exchange of the peer discovery request and the peer discovery response between the first network device and the second network device, and involves:
      the first network device generating a first pairwise master key (PMK) identifier (PMKID) using a second connector configured for the second network device during a DPP configuration stage, wherein the second connector is included in an authentication response transmitted by the second network device; and
      the second network device generating a second PMKID using a first connector configured for the first network device during the DPP configuration stage, wherein the first connector is included in an authentication request transmitted by the first network device.

2. The method of claim 1, wherein the forming of the secure connection by performing the optimized network introduction procedure comprises the first network device and the second network device performing an authentication frame exchange, an association frame exchange, and a four-way handshake with one another.

3. The method of claim 1, wherein the forming of the secure connection by performing the optimized network introduction procedure comprises:

the first network device transmitting the authentication request to the second network device, the authentication request comprising at least the first connector configured for the first network device during the DPP configuration stage;

the first network device receiving the authentication response from the second network device responsive to transmitting the authentication request, the authentication response comprising at least the second connector configured for the second network device during the DPP configuration stage;

the first network device generating a PMK based least in part on information in the authentication response;

the first network device generating the first PMKID;

the first network device transmitting an association request to the second network device, the association request comprising at least the first PMKID;

the first network device receiving an association response from the second network device responsive to transmitting the association request; and the first network device performing a four-way handshake procedure with the second network device.

4. The method of claim 1, wherein the forming of the secure connection by performing the optimized network introduction procedure comprises:

the second network device receiving the authentication request from the first network device, the authentication request comprising at least the first connector configured for the first network device during the DPP configuration stage;

the second network device transmitting the authentication response to the first network device responsive to receiving the authentication request, the authentication response comprising at least the second connector configured for the second network device during the DPP configuration stage;

the second network device generating a PMK based least in part on information in the authentication request;

the second network device receiving an association request from the first network device, the association request comprising at least the first PMKID generated by the first network device;

the second network device transmitting an association response to the first network device responsive to receiving the association request; and the second network device performing a four-way handshake procedure with the first network device.

5. The method of claim 1, wherein the forming of the secure connection comprises forming a first connection between the first network device and the second network device.

6. The method of claim 1, wherein the forming of the secure connection comprises forming the secure connection between the first network device and the second network device during roaming or steering by the first network device or the second network device.

7. The method of claim 1, wherein the DPP network comprises a multiple-access point (MAP) DPP network.

8. The method of claim 1, wherein the DPP network comprises a non-multiple-access point (non-MAP) DPP network.

9. The method of claim 1, wherein the second network device comprises a controller, an access point (AP) or a first agent, and wherein the first network device comprises a second agent or a station (STA).

10. An apparatus, comprising:

a transceiver configured to communicate wirelessly; and a processor coupled to the transceiver and configured to, via the transceiver, form a secure connection between a first network device and a second network device in a HAR Device Provisioning Protocol (DPP) network by performing an optimized network introduction procedure, wherein, relative to a convention network introduction procedure comprising sending a peer discovery request and sending a peer discovery response, an overhead in network introduction frame exchanges is reduced with the optimized network introduction procedure, and wherein the optimized network introduction procedure involves no frame exchange of the peer discovery request and the peer discovery response between the first network device and the second network device, and involves:

the first network device generating a first pairwise master key (PMK) identifier (PMKID) using a second connector configured for the second network device during a DPP configuration stage, wherein the second connector is included in an authentication response transmitted by the second network device; and the second network device generating a second PMKID using a first connector configured for the first network device during the DPP configuration stage, wherein the first connector is included in an authentication request transmitted by the first network device.

11. The apparatus of claim 10, wherein, in forming the secure connection by performing the optimized network introduction procedure, the processor is configured to perform an authentication frame exchange, an association frame exchange, and a four-way handshake.

12. The apparatus of claim 10, wherein the apparatus is implemented in or as the first network device, and wherein, in forming the secure connection by performing the optimized network introduction procedure, the processor is configured to perform operations comprising:

transmitting the authentication request to the second network device, the authentication request comprising at least the first connector configured for the first network device during the DPP configuration stage;

receiving the authentication response from the second network device responsive to transmitting the authentication request, the authentication response comprising at least the second connector configured for the second network device during the DPP configuration stage;

generating a PMK based least in part on information in the authentication response;

generating the first PMKID;

transmitting an association request to the second network device, the association request comprising at least the first PMKID;

receiving an association response from the second network device responsive to transmitting the association request; and performing a four-way handshake procedure with the second network device.

13. The apparatus of claim 10, wherein the apparatus is implemented in or as the second network device, and wherein, in forming the secure connection by performing the optimized network introduction procedure, the processor is configured to perform operations comprising:

receiving the authentication request from the first network device, the authentication request comprising at least the first connector configured for the first network device during the DPP configuration stage;

transmitting the authentication response to the first network device responsive to receiving the authentication request, the authentication response comprising at least the second connector configured for the second network device during the DPP configuration stage;

generating a PMK based least in part on information in the authentication request;

receiving an association request from the first network device, the association request comprising at least the first PMKID generated by the first network device;

transmitting an association response to the first network device responsive to receiving the association request; and performing a four-way handshake procedure with the first network device.

14. The apparatus of claim 10, wherein, in forming the secure connection, the processor is configured to form a first connection between the first network device and the second network device.

15. The apparatus of claim 10, wherein, in forming the secure connection, the processor is configured to form the secure connection between the first network device and the second network device during roaming or steering by the first network device or the second network device.

16. The apparatus of claim 10, wherein the DPP network comprises a multiple-access point (MAP) DPP network.

17. The apparatus of claim 10, wherein the DPP network comprises a non-multiple-access point (non-MAP) DPP network.

18. The apparatus of claim 10, wherein the first second network device comprises a controller, an access point (AP) or a first agent, and wherein the first network device comprises a second agent or a station (STA).

* * * * *